(12) United States Patent
Segel

(10) Patent No.: US 9,178,959 B2
(45) Date of Patent: Nov. 3, 2015

(54) METHOD AND APPARATUS FOR PREDICTING VALUE OF CACHING CONTENT ITEMS

(75) Inventor: Jonathan Segel, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 949 days.

(21) Appl. No.: 12/167,225

(22) Filed: Jul. 2, 2008

(65) Prior Publication Data

US 2010/0005046 A1   Jan. 7, 2010

(51) Int. Cl.
*G06F 17/00* (2006.01)
*H04L 29/08* (2006.01)

(52) U.S. Cl.
CPC ............ *H04L 67/2847* (2013.01); *H04L 67/28* (2013.01)

(58) Field of Classification Search
CPC ....... G06N 5/04; H04L 67/2847; H04L 67/28
USPC ...................... 707/694, 46; 706/46
See application file for complete search history.

(56) References Cited

U.S. PATENT DOCUMENTS

| | | | | | |
|---|---|---|---|---|---|
| 5,878,223 | A | * | 3/1999 | Becker et al. | 709/223 |
| 6,016,520 | A | * | 1/2000 | Facq et al. | 710/33 |
| 6,067,565 | A | * | 5/2000 | Horvitz | 709/218 |
| 6,085,226 | A | * | 7/2000 | Horvitz | 709/203 |
| 6,088,718 | A | * | 7/2000 | Altschuler et al. | 709/203 |
| 6,098,064 | A | * | 8/2000 | Pirolli et al. | 1/1 |
| 7,076,500 | B2 | * | 7/2006 | Gallant et al. | 711/118 |
| 7,353,339 | B2 | * | 4/2008 | Komarla et al. | 711/137 |
| 7,721,061 | B1 | * | 5/2010 | Kelly et al. | 711/167 |
| 2003/0217113 | A1 | * | 11/2003 | Katz et al. | 709/213 |
| 2005/0144394 | A1 | * | 6/2005 | Komarla et al. | 711/137 |
| 2005/0210530 | A1 | * | 9/2005 | Horvitz et al. | 725/134 |
| 2006/0010467 | A1 | | 1/2006 | Segel | |
| 2007/0136533 | A1 | * | 6/2007 | Church et al. | 711/137 |

OTHER PUBLICATIONS

Lynnes, C. et al., Application of Bayesian Classification to Content-based Data Manangement, ESTC 2004, available at http://www.esto.nasa.gov/conferences/estc2004/papers/b8p4.pdf (retreived Mar. 16, 2011).*
Cunha, Carlos R., et al., "Determining WWW User's Next Access and Its Application to Pre-fetching", Second IEEE Symposium on Computers and Communications, Alexandria, Egypt, Jul. 1-3, 1997, pp. 6-11.*

* cited by examiner

*Primary Examiner* — Robert Stevens
(74) *Attorney, Agent, or Firm* — Wall & Tong, LLC

(57) ABSTRACT

The invention includes a method and apparatus for predicting value of caching content items. In one embodiment, a method for selecting ones of a plurality of content items to be cached includes, for each of the content items, determining a probability of use of the content item comprising a probability that the content item will be used if cached, determining a value of caching the content item, and computing a caching value estimate associated with the content item using the probability of use of the content item and the value of caching the content item. The content items to be cached may then be selected using the respective caching value estimates of the content items.

23 Claims, 6 Drawing Sheets

METHOD AND APPARATUS FOR PREDICTING VALUE OF CACHING CONTENT ITEMS

FIELD OF THE INVENTION

The invention relates to the field of communication networks and, more specifically, to controlling caching of media content.

BACKGROUND OF THE INVENTION

There are advantages to caching content closer to users, including improved responsiveness to user requests and control of costs driven by network peaks; however, existing content caching schemes do not perform well. Existing content caching techniques are very limited in their ability to predict future consumption. Furthermore, existing content caching techniques have other associated problems as well.

One approach to content caching is to avoid prediction altogether. This is typically done by asking the user to search, find, select, and specify what content they will want in future. This approach is used by current personal video recorders to cache broadcast television content on behalf of users. Disadvantageously, however, the limited willingness of users to take on the additional work associated with this approach makes this approach scale poorly.

Another common content caching technique, used in transparent web caches, makes no attempt to predict content consumption; rather, a copy of content that has been requested in the past is held for a period of time, in case it is requested again. In the context of caching on behalf of single users and video content this performs extremely poorly because people rarely want to watch video content they have seen in the past (which is the only content that this caching technique will hold). Even where caching occurs on behalf of many users, this approach to caching may recognize the value of caching an item too late to be of use in reducing peak demands.

Another approach to content caching, which is used in some video-on-demand systems, is to assume that all users are identical. In this approach, a determination is made as to which content items are most in demand in aggregate, and those content items are then cached for all users. While this approach may work fairly well, failure to recognize differences between users, and that user preferences are not constant over time, produces undesirable caching results which may unnecessarily waste network resources.

Another approach to content caching is to capture the history of user viewing at particular points in time and find content items that are similar to those watched by the user (a process commonly referred to as item-to-item collaborative filtering). An index of those content items is then given back to the user who will save them to a local cache (e.g., using a DVR/PVR) when they appear in the broadcast schedule. Disadvantageously, however, this approach has many deficiencies. First, caching does not occur proactively to de-load the network; rather, it occurs opportunistically, whenever a "target" content item appears in the broadcast schedule. Second, such caching cannot deal with short term variation in the preferences of end-users because it assumes a single static preference profile.

Furthermore, in addition to the various problems associated with existing content caching techniques, caching of content closer to users becomes an increasingly important problem both as the amount of available content increases (fragmenting the audience) and as users move towards delivery modes such as unicast video-on-demand. Where a service provider is delivering personalized services to a user (e.g., video-on-demand in response to requests from the user, or a personalized channel for the user), content caching may be improved by predicting which content is most likely to be useful to that user and moving that content closer to the user before they need it.

SUMMARY OF THE INVENTION

Various deficiencies in the prior art are addressed through a method and apparatus for predicting value of caching content items. In one embodiment, a method for selecting ones of a plurality of content items to be cached includes, for each of the content items, determining a probability of use of the content item comprising a probability that the content item will be used if cached, determining a value of caching the content item, and computing a caching value estimate associated with the content item using the probability of use of the content item and the value of caching the content item. The content items to be cached may then be selected using the respective caching value estimates of the content items.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1:
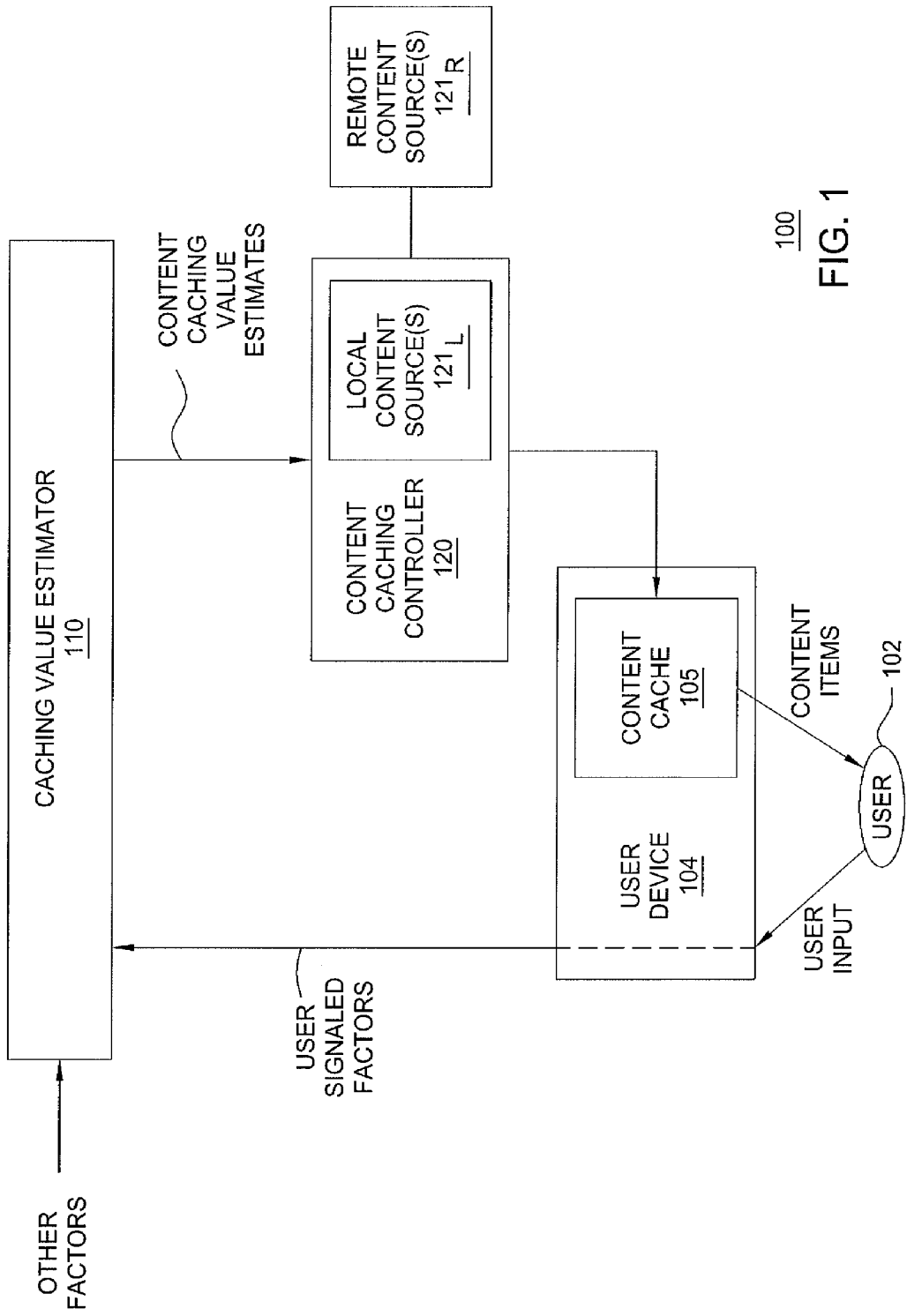
FIG. 1 depicts a high-level block diagram of a content caching system.

The present invention includes a method and apparatus for selecting content items to be cached, where selection of content items to be cached may be performed by predicting which items are most likely to be used, and assessing how valuable it is to cache those items. In some embodiments, there is no assumption that user preferences are static over time, and mechanisms for predicting what preferences users are likely to signal in future may be incorporated, such that the prediction of caching value can accurately track changes in both the probability of use and the value of caching over time and in response to different users, changes in the inventory of content items, changing user preferences, and the like, as well as various combinations thereof.

The present invention enables improved decisions of which content items to cache. The present invention determines the future prediction of probability of use of associated content items by users. The future prediction of probability of use of associated content items by a user may be determined by predicting signaling that may be received from that user in the future (which may itself may be predicted using observations of signaling that has already been received, as well as other external factors). The prediction of probability of use of associated content items by a user can be further improved by recognizing that user preferences are not static over time, such that a model of a user may be constructed where the model predicts the type of content which the user is likely to use at different points in the future and uses this information to improve the accuracy of the prediction. This prediction of probability of use for a user is inherently specific to the user and, therefore, will correctly cache content of interest to that user and not cache content unlikely to be needed by that user. Thus, by predicting which content items are most likely to be useful to the user in the future, those content items may be propagated toward the user in a more efficient manner (e.g., by scheduling the content items to be propagated toward the user during off-peak times).

Although primarily depicted and described herein with respect to embodiments in which content items are cached for a user at a user device associated with the user, content items may be cached in other locations (e.g., content items may also be cached at one or more shared network nodes from which multiple users are served). In such embodiments, information indicative of the prediction of probability of use for a user has usefulness beyond caching for that user, however, because by aggregating such information across a set of users (for example, the set of users subtended by an access network node), the utility of caching content items at those aggregated network nodes may also be determined.

Although primarily depicted and described herein with respect to embodiments in which entire content items are cached, in other embodiments only a portion of one or more of the content items may be cached. Thus, it should be noted that references made herein to caching a content item may also be read as caching some portion of a content item rather than caching the content item in its entirety (e.g., caching some initial portion of the content item which may be presented to the user from the cache while remaining portions of the content item are propagated to the user), as this may allow more content items to be cached within a fixed storage capacity, thereby improving the odds that a content item selected by the user will be at least partially cached at the time the content item is requested by the user.

FIG. 1 depicts a high-level block diagram of a content caching system. The content caching system 100 is depicted and described with respect to a user 102 using an associated user device 104. The content caching system 100 includes a caching value estimator 110 and a content caching controller 120. The user 102 provides user input using user device 104. The user device 104 provides the user input to caching value estimator 110. The caching value estimator 110 caching value estimates for content items, respectively. The caching value estimator 110 provides caching value estimates to content caching controller 120. The content caching controller 120 selects ones of the content items to be provided to user device 104 for user 102. The content caching controller 120 controls propagation of the selected one of the content items to user device 104 for user 102. The user device 104 receives the propagated content items and caches the received content items for presentation to user 102.

As depicted in FIG. 1, user device 104 includes user interaction capabilities, communications capabilities, content storage capabilities, content presentation capabilities, and the like. For example, user device 104 may be a television system (e.g., including a remote control, a settop box, and a television), a computer system (e.g., including a keyboard and mouse, a modem, and a computer monitor), a cellular phone (e.g., including a keypad, wireless transceiver, and one or more display screens), and the like. The user device 104 may include any other device or combination of devices.

The user device 104 is adapted to enable user 102 to enter user input, which may include any information input by user 102, such as content selection operations (e.g., channel change operations, available content browsing operations, content feedback entry operations, and the like), signaled factors (e.g., signaling of information such as audience information (e.g., who is watching), preferred genre information, available time information, and so forth), and the like, as well as various combinations thereof. The user device 104 propagates at least a portion of the user input (e.g., user signaled factors, content items consumed, and the like) to caching value estimator 110, e.g., for use in determining the joint probability of observing a given set of user signaled factors $[S_n]$ when a particular content item $I_k$ is consumed.

The user device 104 is adapted to receive content items from content caching controller 120. The user device 104 caches received content items (illustratively, in a content cache 105 of user device 104, e.g., such as hard disk, flash memory, and/or any other means of storing content). The user device 104 may receive and cache content items in any manner. The user device 104 enables user 102 to request presentation of cached content items (e.g., by browsing a list of cached content items and selecting from the list of cached content items). The user device 104 retrieves content items selected by user 102 and presents the content items to user 102.

For purposes of clarity in describing content caching value estimation functions of the present invention, the content caching value estimation functions of the present invention are primary depicted and described herein within the context of embodiments in which content caching value estimation is performed for a single user for use in determining which content items to cache on an associated user device (i.e., using content caching capability (105) such as hard disk, flash memory, and the like). As described herein, in other embodiments content may be cached within the network (e.g., at a network node for a group of users served by the network node), in which case the content caching value estimation functions may be performed such that the value of caching is aggregated across all subtended users.

The caching value estimator 110 is adapted to perform content caching estimation functions described herein. The caching value estimator 110 receives user input from user device 104. The caching value estimator 110 determines caching value estimates for content items using predicted future user input, which may be based, at least in part, on actual input currently being received from the user. The caching value estimator 110 provides future caching value estimates for content items to content caching controller 120. The content prediction functions of caching value estimator 110 may be better understood with respect to FIG. 2-FIG. 5.

The content caching controller 120 is adapted to perform content caching control functions depicted and described herein. The content caching control functions may include controlling selection of content items to be cached for user 102, controlling propagation of the selected items to user device 104 to be cached for user 102, and the like.

The content caching controller 120 controls selection of ones of the content items for propagation to user device 104 to be cached for user 102, so that ones of the content items predicted to be most useful to the user 102 may be cached closer to the user 102 in advance (e.g., during off-peak network times). In this manner, content caching controller 120 is adapted to evaluate content items using respective predictions of the future utility of the content items (i.e., by predicting a future probability of a content item being consumed by the user 102).

The content caching controller receives caching value estimates for respective content items from caching value estimator 110. The content caching controller 120 selects ones of the content items to be provided to user device 104 using the respective caching value estimates associated with content items available for selection. The content caching controller 120 may use the respective caching value estimates to select ones of the content items to be provided to user 102 in many ways.

In one embodiment, content caching controller 120 selects ones of content items having the highest respective caching value estimates (e.g., without considering other factors).

In one embodiment, content caching controller 120 selects ones of content items using the respective caching value estimates and at least one other factor. For example, other factors may include a list of which content items are already cached at a node, the storage space available for caching at a node, the state of congestion of the network, and the like, as well as various combinations thereof.

The content caching controller 120 controls propagation of selected ones of the content items to user device 104 for user 102.

In one embodiment, content items may be stored locally on content caching controller 120 (illustratively, as local content source(s) $121_L$), in which case content caching controller 120 retrieves selected ones of the content items locally, and propagates the selected ones of the content items to user device 104.

In one embodiment, content items may be stored remotely from the content caching controller 120 (illustratively, one or more remote content source(s) $121_R$). In one such embodiment, content caching controller 120 retrieves selected ones of the content items, and propagates the selected ones of the content items to user device 104. In another such embodiment, content caching controller 120 directs the remote content source(s) $121_R$ to propagate the selected ones of the content items to user device 104.

The content caching controller 120 may control propagation of selected ones of the content items to user device 104 in various other ways.

The selected content items may be propagated to user device 104 in any manner (e.g., propagated using any content propagation capabilities, scheduled to be propagated at any time, and the like, as well as various combinations thereof).

Although omitted for purposes of clarity, communications between components of the content caching system 100 may be provided in any manner (e.g., using any communications technologies, signaling protocols, bearer protocols, and the like). For example, communications between components of the content caching system 100 may be supported using one or more of a cable television network, an Internet Protocol (IP) network, a cellular network, and the like, as well as various combinations thereof.

Although primarily depicted and described herein with respect to embodiments in which content prediction function are provided by the caching value estimator 110 and the content caching control functions are provided by the content caching controller 120, where caching value estimator 110 and content caching controller 120 are implemented as separate systems, the content prediction functions and content caching control functions depicted and described herein may be implemented in other ways.

In one embodiment, caching value estimator 110 and content caching controller 120 may be implemented within the same system (e.g., where the content prediction functionality is implemented within the content caching controller such that user signaled factor and other input information is received at the content caching controller). In one embodiment, the content prediction functions and the content caching control functions may be distributed across multiple systems in various other ways.

Figure 2:
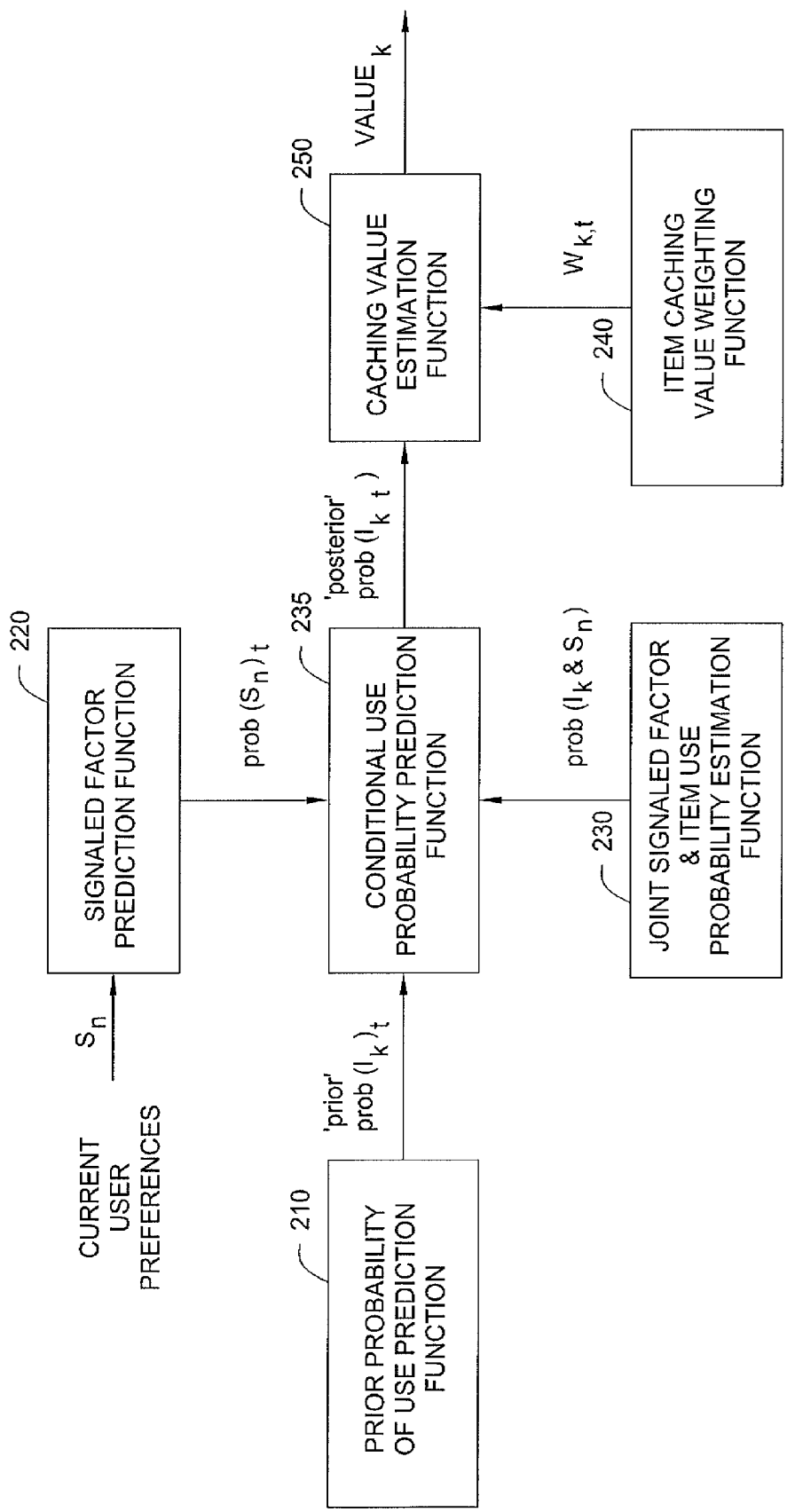
FIG. 2 depicts a high-level block diagram of the caching value estimator of the content caching system of FIG. 1.

FIG. 2 depicts a high-level block diagram of the caching value estimator. The caching value estimator 110 operates on a set of content items (I) having a plurality of content items (denoted as $I_k$). The caching value estimator 110 outputs a future value of caching measure for each content item ($I_k$) in the set of content items (I). The operation of caching value estimator 110 is primarily depicted and described within the context of determining a caching value estimate for one content item (for purposes of clarity); however, it should be noted that, in practice, caching value estimator 110 will evaluate many such content items in order to determine which content items are the best candidates for caching.

As depicted in FIG. 2, caching value estimator 110 includes a prior probability of use prediction function 210, a signaled factor prediction function 220, a joint signaled factor and item use probability estimation function 230, a conditional use probability prediction function 235, an item caching value weighting function 240, and a caching value estimation function 250. The prior probability of use prediction function 210, the signaled factor prediction function 220, and the joint signaled factor and item use probability estimation function 230 provide information to conditional use probability prediction function 235. The conditional use probability prediction function 235 and item caching value weighting function 240 provide information to caching value estimation function 250 for use in determining future caching value estimates for content items.

The prior probability of use prediction function 210 provides a prior prediction of probability of use (denoted as prior($I_k$)), determined for given content items $I_k$, for use by conditional use probability prediction function 235.

The prior prediction of probability of use prior($I_k$) of content item $I_k$ is the probability that content item $I_k$ will be consumed (determined in the absence of signaling from the user, i.e., without accounting for signaled factors $S_n$). The prior prediction of probability of use prior($I_k$) of content item $I_k$ may be calculated using many different factors.

In one embodiment, for example, prior prediction of probability of use prior($I_k$) of content item $I_k$ may be calculated based on one or more of the following factors: past viewing history of the user, feedback from the user, knowledge of popularity of the content item with other users (e.g., especially users known to similar in demographic characteristics such as age and gender, and knowledge of popularity of the content item with other users known to have liked the same content items and disliked the same content items as this user in the past), time-based factors (e.g., time of day, day of week, season, and the like), and the like, as well as various combinations thereof.

In one embodiment, for example, prior prediction of probability of use prior($I_k$) of content item $I_k$ may be calculated using the average probability of usage among past content items which are known to be similar.

In one embodiment, for example, prior prediction of probability of use prior($I_k$) of content item $I_k$ may be calculated based on factors which are independent of individual users, such as the gross box-office receipts on theatrical release (a popularity metric) combined with the length of time since this item became available within this most of distribution, and the like, as well as various combinations thereof.

The prior prediction of probability of use prior($I_k$) of content item $I_k$ may be calculated using other factors.

As described herein, the user has the opportunity to actively signal a number of signaled factors (denoted as $S_n$) to indicate current preferences of the user.

The signaled factors $S_n$ may include information in one or more signaled factor categories. In one embodiment, the signaled factor categories include an audience factor category (e.g., what set of individuals are consuming the content), a currently preferred genre factor category (e.g., what type of content that audience is in the mood to watch), and an available time category (e.g., how much time the audience has available to consume the content, the desired maximum length of content items, and the like). The signaled factors $S_n$ may include less or more factors which may be signaled by a user to indicate the current preferences of the user.

An audience factor indicates the type of audience that is currently expected to consume the content. An audience factor may include any information associated with the audience (e.g., an index to a known set of potential audience members from information can be sourced as to the age of each person in the audience, the sex of each person in the audience, information for a group of persons in the audience, and the like). For example, the user may signal that children are present so that content should be age appropriate. For example, the user may signal that no children are present so that content is not limited based on the rating of the content. The user may signal any other audience information.

A genre factor indicates the type of content that the user currently prefers. A genre factor may include any information associated with the genre of content preferred by the user (e.g., one genre which the user would like to see, multiple genres which the user would like the see, a ranked list of genres, and the like). For example, the user may signal that he is currently in the mood for a drama. For example, the user may signal that he is currently in the mood for a romantic comedy or an action/adventure movie, with a slight preference for a romantic comedy. The user may signal any other genre information.

An available time factor indicates the amount of time that the user has available to consume the content. For example, the user may signal that he only has one hour available and that only content that fits within that window should be proposed. For example, the user may signal that he is only available from 9 PM-10:30 PM. The user may signal any other time available information.

The signaled factors $S_n$ may include other information. For example, a user may also signal one or more of a preference for content items which are familiar or different, a preference for content items which are lighter or more serious in mood, a preference for content items which are highly rated by experts or other users or popular in general, a preference for content items which meet specified filter criteria (e.g., such as age-appropriateness ratings) or which do not contain specified types of objectionable content, and the like, as well as various combinations thereof. For example, a user may signal an indication that a set of specified preference profiles should be used (e.g., to have a private profile that cannot accidentally be accessed by children). A user may signal various other factors.

In one embodiment, a user may only signal a subset of the available factors, leaving other factors unspecified, or may not signal any factors. Thus, signaled factor prediction function 220 may need to work from a full set of currently signaled factors $S_n$, from a partial set of currently signaled factors $S_n$, or from no currently signaled factors at all.

In one embodiment, for $S_n$, each factor n is a stochastic (or probability) vector. In one such embodiment, a factor can have zero, one, or multiple values, up to w, which represents the maximum number of possible specific values. Thus, $2^w$ vector components will exist for that factor, and the sum of the discrete probability distribution across all the vector components will be one. Thus, where there are multiple signaled factors, $S_n$ will, in general, be a set of such stochastic vectors. An example of a stochastic vector representation of $S_n$ follows.

In this example, assume that there are 3 signaled factors, "Genre" "Time-Available" and "Audience".

The "Genre" signaled factor (denoted as $S_1$) may have zero, one or more of the following values: "Action", "Romance", or "Comedy". A value is assumed to either be present or absent (i.e., it does not have a strength or weight).

The "Time-Available" signaled factor (denoted as $S_2$) may have zero, one, or more of the following values: "½ hr", "1 hr", or ">1 hr".

The "Audience" signaled factor (denoted as $S_3$) may have zero, one, or more of the following values: "Joe", "Carol".

In this example, the "Genre" signaled factor has eight possible combinations which are the components of the stochastic vector describing "Genre". The components of the stochastic vector describing "Genre" are listed in Table 1.

TABLE 1

| Component | Action | Comedy | Romance |
|---|---|---|---|
| Component G1 | N | N | N |
| Component G2 | N | N | Y |
| Component G3 | N | Y | N |
| Component G4 | N | Y | Y |
| Component G5 | Y | N | N |
| Component G6 | Y | N | Y |
| Component G7 | Y | Y | N |
| Component G8 | Y | Y | Y |

In this example, the "Time-Available" signaled factor also has eight possible combinations which are the components of the stochastic vector describing "Time-Available". The stochastic vector describing "Time-Available" is not depicted, but the components may be referred to herein as "T" components).

In this example, the "Audience" signaled factor only has four possible combinations which are the components of the stochastic vector describing "Audience" (because there are only two possible values). The stochastic vector describing "Audience" is not depicted, but the components may be referred to herein as "A" components).

In this example, $S_n$ may therefore be represented as (described in terms of the vector components:

$$S_n = \left\{ \begin{array}{l} [\text{Genre}] \\ [\text{Time-Available}] \\ [\text{Audience}] \end{array} \right\}$$

$$= \left\{ \begin{array}{l} [G1, G2, G3, G4, G5, G6, G7, G8] \\ [T1, T2, T3, T4, T5, T6, T7, T8] \\ [A1, A2, A3, A4] \end{array} \right\}$$

As described herein, at any instant in time, only one component from each vector may be true. Thus, a possible "current" value of $S_n$ may be:

$$S_n = \left\{ \begin{array}{c} [\text{Genre}] \\ [\text{Time - Available}] \\ [\text{Audience}] \end{array} \right\}$$

$$= \left\{ \begin{array}{c} [1,0,0,0,0,0,0,0] \\ [0,0,0,0,1,0,0,0] \\ [0,0,0,1] \end{array} \right\}$$

Thus, it may be seen that there are 256 possible "scenarios" (8×8×4) for $S_n$ in this example.

In this example, a possible value for prob($S_n$) may be (note that the sum of probabilities across each row (vector) must add to one):

$$prob(S_n) = \left\{ \begin{array}{c} [0.4,0.1,0.1,0.05,0.05,0.1,0.1,0.1] \\ [0.05,0.05,0.1,0.1,0.3,0.2,0.1,0.1] \\ [0.2,0.1,0.3,0.4] \end{array} \right\}$$

If the user has signaled one or more factors $S_n$, the prediction of probability of use of each content item $I_k$ (i.e., the probability of the content items being consumed) changes. For example, if the user signals that he is in the mood for a comedy, all content items that have a comedic element increase in probability and all content items that do not have a comedic element decrease in probability. For example, if the user signals that children are in the audience, content items with MPAA ratings of G and PG increase in probability and content items with other MPAA ratings decrease in probability.

For content caching purposes, however, there is little utility to discover that the user is now in the mood for something different than was previously cached. Rather, what is needed is a prediction of what the set of user signaled factors $S_n$ will be in the future. As described herein, in addition to receiving the set of currently signaled factors $S_n$, the probability of particular signaled factors $S_n$ being signaled at a time t in the future may be predicted in advance (i.e., the set of signaled factors $S_n$ is predicted to be received at a time t in the future with probability prob($S_n$)$_t$).

A set of signaled factors $S_n$, for which the probability of that set of signaled factors $S_n$ being received in the future is determined, is referred to herein as a set of predicted signaled factors. A probability of a set of predicted signaled factors $S_n$ being signaled at points in time t in the future is referred to herein as predicted signaled factor probability (denote as prob($S_n$)$_t$). The set of predicted signaled factors $S_n$ and associated predicted signaled factor probabilities prob($S_n$)$_t$ for the set of predicted signaled factors $S_n$ may be referred to collectively as predicted signaled factor probability prob($S_n$)$_t$.

The signaled factor prediction function 220 determines predicted signaled factor probability prob($S_n$)$_t$ for use by conditional use probability prediction function 235. The signaled factor prediction function 220 determines predicted signaled factor probability prob($S_n$)$_t$ based on previously received signaled factors $S_n$, currently received signaled factors $S_n$, external factors, and the like, as well as various combinations thereof. The signaled factor prediction function 220 may determine predicted signaled factor probability prob($S_n$)$_t$ for individual signaled factors and/or groups of signaled factors (referred to herein as scenarios). The signaled factor prediction function 220 may determine estimates of predicted signaled factor probability prob($S_n$)$_t$ based on any information and may update estimates of predicted signaled factor probability prob($S_n$)$_t$ based on any information.

In one embodiment, signaled factor prediction function 220 may determine predicted signaled factor probability prob ($S_n$)$_t$ by using two parallel methods of predicting signaled factor probability prob($S_n$)$_t$ and deriving a composite measure therefrom.

In this embodiment, the first method (referred to herein as the "state transition" method) is based on the observation that users will often stick with the signaled factor settings which are currently in place. In other words, the currently signaled factors may be a good predictor of what the signaled factors will be in future. Further, users may be more likely to make incremental changes to the current settings, as opposed to changing all settings to some completely different values. Thus, the "state transition" method is similar to a Markov model, in that it is based on the current signaled state and calculates the probability of being in other states at points in the future based on transition probabilities from the current state to those future states. In the "state transition method", a full set of all the combinations of signaled factors $S_n$ may be modeled, but, in general, each signaled factor is modeled independently. For example, if there are 5 factors, each of which is in a current state, a calculation captures the probability of each of those 5 factors moving to five new states. This independence has several benefits, including: (1) it simplifies the calculation dramatically because only (r×p) transition probabilities are needed (where r is the number of factors and p is the number of possible transitions per factor), instead of $r^p$ transition probabilities; and (2) it is also quite likely that users will change one factor at a time so a per factor transition probability is effective in that sense.

The probability of being in a future state $(S_n)_t$ calculated via this metric will be referred to as prob($S_n$)$_{t\ m1}$.

In this embodiment, the second method (referred to herein as the "frequency" method) does not use the current state as the basis for predicting future state, but, rather, focuses on user behavior over time. Within one or more of the following three techniques are used: (1) "min-max capped duration weighted by recency", (2) Bayesian updating, and (3) "time series forecasting with seasonality". As with the "state transition" method, in the "frequency" method a full set of all the combinations $S_n$ may be modeled, but, in this embodiment, each signaled factor n is modeled independently. A description of the three techniques follows.

In the "min-max capped duration weighted by recency" approach to predicting future signaled factor probability prob ($S_n$)$_t$, the estimate of what signaled factors will be sent by the user in the future is based on the long-term average proportion of time that the user has set factor n to a particular value in the past. The averaging may also be weighted not only on duration-in-scenario, but also to give more weight to more recent behavior (which would be appropriate where we expect user behavior or preferences to evolve over time). A weighted exponential smoothing function of the duration which a signaling factor spends in different states would be an example of a mechanism for implementing this approach.

In one embodiment, it will also be important to exclude outliers from this calculation. For example, if a user signals a very unusual pattern of preferences, this information should not be incorporated into the long-term profile for that user unless and until it is repeated or sustained over time. This could be accomplished by setting a minimum threshold on duration-in-scenario before it is added to the averaging calculation (i.e., the "min" in "min-max"). This threshold could be used to prevent an accidental corruption of the long-term profile based on a mistaken set of signaled factors, changes to the long-term profile that may result when the user is sampling other possibilities, changes to the long-term profile that may result from signaling from a transient houseguest, or any other similar situations that may result in undesired changes to the long-term profile of the user.

In one embodiment, a maximum duration threshold is used to ensure that signaling from the user is active rather than accidental, in other words to give more weight to information signaled from users if there is evidence to suggest that the user is actively using the system, as opposed to signaling a certain situation and then walking away (for example setting up signaled preferences for a TV, but not actually watching the TV). This evidence could come from other control information received from a user (e.g., a content item selection, a fast-forward command, or other active user input). In other words, the figure used for the "duration" of a scenario could be limited (i.e., the "max" in "min-max") based on other observed user behavior. If a user has not pressed any key or otherwise indicated that they are still watching or using the content, then the duration of that scenario may be capped.

The Bayesian updating approach to predicting future signaled factor probability $prob(S_n)_t$ uses the same "min-max duration" information as noted in the "min-max" approach, but begins from a prior estimate of signaled factor probability $prob(S_n)_t$ and progressively updates the estimate of $prob(S_n)_t$ as new observations of user signaling $S_n$ are captured. The initial prior estimate of signaled factor probability $prob(S_n)_t$ may be generated in a number of ways.

In one embodiment, the initial prior estimate of signaled factor probability $prob(S_n)_t$ may be generated by capturing the signaled behavior of other existing users over time. In one embodiment, the initial prior estimate of signaled factor probability $prob(S_n)_t$ may be calculated from one or more of: (1) the signaled behavior of a set of users who are believed to be similar to the new user based on demographic factors (e.g., age, gender, location, and the like); (2) information captured at the time the new users is set up, such as preferences expressed directly in signaled factor terms, or preferences inferred from sample cases where the user expresses likes or dislikes for content items; and the like, as well as various combinations thereof.

In the Bayesian updating approach to predicting future signaled factor probability $prob(S_n)_t$, from the initial prior estimate of signaled factor probability $prob(S_n)_t$, better estimates are formed iteratively over time by observation of signaled factors $S_n$ over time for the given user. In other words, Bayesian updating approach assumes that the user is "average", and then uses new "min-max duration weighted by recency" observations to progressively move the given user away from the "average" towards the true individual behavior of that given user.

In the "time series forecasting with seasonality" approach to predicting future signaled factor probability $prob(S_n)_t$, the notion of time is enhanced beyond that which is captured by the "min-max capped duration weighted by recency" approach to reflect the fact that users will tend to have a preference for different kinds of content at different times of the day, different days of the week, and in proximity to holidays, i.e., what is referred to in time-series forecasting as "seasonality" effects. In this approach, initially, little information about the user will be available, but, over time, sufficient information will be gathered within each time interval to distinguish behavior in those time intervals from behavior in other time intervals.

In one embodiment, the estimation of the predicted signaled factor probability $prob(S_n)_t$ may be updated by separating the calculation into different discrete time intervals. This embodiment may be denoted as scenario likelihood splitting. In general, scenario likelihood splitting is the process of breaking a single estimate of scenario likelihood into multiple estimates of scenario likelihood based on one or more time factors (e.g., time of day, day of week, seasonality factors, and the like, as well as various combinations thereof).

In one such embodiment, scenario likelihood splitting may be triggered as follows: if one set of scenario likelihoods is a good match to the user signaled factors observed at all times, no scenario likelihood splitting is performed; however, if user signaled factors observed at one time are different than user signaled factors observed at another time, and the difference is reinforced over multiple time cycles, then a scenario likelihood split is warranted. For example, assuming that there is a pattern of signaled preference for half-hour length, children genre items from 3 PM-7 PM which is statistically different from the pattern of signaled preference for full-length action movies from 7 PM-11 PM, the scenario likelihood preference would be split into two time-based variants (i.e., one for before 7 PM and one for after 7 PM). The process of likelihood splitting has the advantage that a profile can be constructed for a new user based on the observed behavior of other users in the past in aggregate, based on the observed behavior of other users who have the same demographics, based on the observed behavior of other users who have responded in similar ways to profiling questions, and the like, as well as various combinations thereof.

In one embodiment, estimation of scenario likelihood is inherently tied to the time factors such that estimation of scenario likelihood is based on received signaled factors for each time of day, day of week, seasonality, and other time factors. If there is not enough data to reliably predict the signaled factors that are likely to be signaled at a point in time, signaled factor data may be borrowed from other similar data (e.g., data that is most similar (e.g., day of week), data that is most closely adjacent to the point of time in question (e.g., time of day), and the like, as well as various combinations thereof. For example, if there is not enough data to reliably predict the signaled factors that are likely to be signaled at 10 AM on a Tuesday in April, signaled factor data may be borrowed from other Tuesdays at 10 AM, other weekdays at 10 AM, other morning periods, and the like, as well as various combinations thereof.

The estimate resulting from the "frequency" method incorporating the "min-max capped duration weighted by recency" approach, the Bayesian updating, and "time series forecasting with seasonality" will be referred to as $prob(S_n)_{t,m2}$.

In one embodiment, weighting of the "state transition" and "frequency" methods with respect to each other may be adjusted. In one embodiment, a per-user/per-factor "activity" measure (denoted herein as $A_n$ for each factor n) will be captured based on observations of how frequently the user tends to change a factor. For example, some users may set their preferences, and leave them at that setting forever, while other users may be continually tweaking their signaled factors. In one such embodiment, if a user is determined to have a low activity measure $A_n$, then the "state transition" method will be given a higher importance relative to the "frequency" method. By contrast, if a user is determined to have a high activity measure $A_n$, then the "frequency" method will be given a higher importance relative to the "state transition" method. In one embodiment, the "state transition" and "frequency" methods may be weighted evenly.

In one embodiment, signaled factor prediction function 220 may determine a composite estimate of predicted signaled factor probability $prob(S_n)_t$ by using the "state transition" method and "frequency" method in parallel. In one such embodiment, the composite estimate of predicted signaled factor probability prob($S_n$)$_t$ will be determined as: prob($S_n$)$_t$=[[prob($S_n$)$_t$ $_{m1}$]×(1-$A_n$)]+[[prob($S_n$)$_t$ $_{m2}$]×($A_n$)]. This predicted signaled factor probability prob($S_n$)$_t$ will be computed separately for each factor n.

In one embodiment, the estimation of the predicted signaled factor probability prob($S_n$)$_t$ may be updated for multiple future instants in time. This embodiment anticipates that likelihood of different scenarios will be different at different times (e.g., different times of the day, days of the week, and the like).

Although primarily depicted and described herein with respect to an embodiment in which the "state transition" and "frequency" methods are used in parallel, in other embodiment, one or the other of these methods may be used individually to determine predicted signaled factor probability prob($S_n$)$_t$.

In one embodiment, one or more of the signaled factors may be predicted as a function of one or more other signaled factors. For example, a genre factor may be predicted as a function of an audience factor. For example, an audience factor may be predicted as a function of an available time factor.

In one embodiment, one or more of the signaled factors may be predicted as a function of one or more of the external factors. For example, the genre factor may be predicted as a function of the time of day (e.g., giving horror movies a higher rating late at night). For example, the audience factor may be predicted as a function of the time of day (e.g., predicting that no young children are present in the audience after 10 PM). For example, the time available factor may be predicted as a function of the day of the week and the time of the day (e.g., the time available may be smaller during the morning on weekdays and larger during the evenings on the weekends). For example, the genre factor may be predicted as a function of the day of the year (e.g., giving Christmas-related content a higher probability near Christmastime).

The external factors include factors that may affect content caching utility, but that are not signaled by the user. In one embodiment, the external factors include time of day, day of week, day of year, and like time-based factors. The external factors may include more or fewer factors that may affect content caching utility, but that are not signaled by the user.

In one embodiment, predicted signaled factor probability prob($S_n$)$_t$ may include a probability value for each combination of signaled factors that may be received in at a future point in time. The predicted signaled factor probability prob($S_n$)$_t$ may include probability values for combinations of signaled factors that may be received at a future point in time, respectively. The predicted signaled factor probability prob($S_n$)$_t$ may include other information associated with signaled factors predicted to be received in the future.

An example showing received signaled factors $S_n$ and predicted signaled factor probability prob($S_n$)$_t$ based on received signaled factors ($S_n$) is depicted in FIG. 2.

In the example of FIG. 2, the user signals the following factors which are input to the prior probability of use prediction function 210: audience=all; genre=comedy; and available time=1 hour. These signaled factors are received at a certain point in time.

The signaled factor prediction function 220, based on the received signaled factors and other information (e.g., previously signaled factors, previous signaled factor predictions, external factors, and the like), determines probabilities of observing specific signal factors at points in the future.

Thus, while at first glance it may seem that estimating predicted signaled factor probability prob($S_n$)$_t$ is unnecessary, merely using currently signaled factors $S_n$ received from the user is inadequate because, in order to cache content in advance, it is necessary to anticipate what will happen at points in the future and, further, the signaled factors $S_n$ received from the user may change over a very short period of time (e.g., over a period of time that is much shorter than the interval of time required to select, retrieve, and cache new content items).

As described herein, predicted signaled factor probability prob($S_n$)$_t$ is estimated based on previously received signaled factors, currently received signaled factors, external factors, interdependencies between signaled factors, interdependencies between signaled factors and external factors, and the like, as well as various combinations thereof.

The joint signaled factor and item use probability estimation function 230 provides conditional prediction of probability of use (denoted as prob($I_k$ & $S_n$)) to conditional use probability prediction function 235. The conditional prediction of probability of use prob($I_k$ & $S_n$) is the joint probability that content item $I_k$ will be used and that user signaled factors $S_n$ will be observed.

The joint probability prob($I_k$ & $S_n$) may be captured and communicated in two ways: (1) as the probability of observing content item $I_k$ given that signaling $S_n$ is present (i.e., prob($I_k$|$S_n$)); or (2) as the probability of observing signaling $S_n$ given that content item $I_k$ was used (i.e., prob($S_n$|$I_k$)). Either of these expressions of the joint probability may be used.

In one embodiment, in which the latter expression of joint probability (prob($S_n$|$I_k$) will be used more commonly than the former expression of joint probability (prob($I_k$|$S_n$)), the latter expression prob($S_n$|$I_k$) will need to be transformed into the former expression prob($I_k$|$S_n$) using a Bayesian updating process.

In this embodiment, conditional prediction of probability of use prob($I_k$ & $S_n$) may be calculated using conditional prediction of probability of use prob($S_n$|$I_k$), which is the probability that signaled factor $S_n$ has been observed when content item $I_k$ was consumed (e.g., observed across multiple users, across multiple time periods, and the like, as well as various combinations thereof). For example, if the content item is a war history, the likelihood that a signaled preference for "comedy" will have been observed when this content item was consumed will be low. The conditional prediction of the probability of use prob($S_n$|$I_k$) for a given content item $I_k$ is determined using observations of which signaled factors $S_n$ were present when content item $I_k$ was actually consumed.

In this embodiment, a posterior probability (denoted herein as posterior prob($I_k$|$S_n$)) is computed, for each content item $I_k$, by conditional use probability prediction function 235 for use by caching value estimation function 250. In this embodiment, posterior prob($I_k$|$S_n$) is computed using the following information: (1) the prior probability that item $I_k$ will be used in the absence of any signaled factors $S_n$ (prior($I_k$)); (2) the predicted signaled factor probability prob($S_n$) of a given signaled factor or a given combination of signaled factors; and (3) the observed intersection between content item viewing and signaled information which may be derived from other users in the past (denoted as prob($S_n$|$I_k$), i.e., the probability that signaled factor $S_n$ was observed when content item $I_k$ was used).

In one such embodiment, posterior probability prob($I_k|S_n$), after considering the different possibilities for signaling factor(s) $S_n$, may be computed at any point in time t as follows:

$$\text{prob}(I_k|S_n) = [\text{prob}(S_n|I_k) * \text{prior}(I_k)] / \text{prob}(S_n)$$

In this embodiment, posterior prob($I_k|S_n$) may be updated as the predicted signaled factor probability prob($S_n$)$_t$ changes (e.g., as signaled factors are received, as external factors change, and the like, as well as various combinations thereof). Since, in general, prob($S_n$) is a function of time, the generalized posterior probability for content item $I_k$ over all periods of time can be expressed as prob($I_k|S_n$)$_t$.

In this embodiment, prior probability of use prediction function 210 provides the prior prediction of probability of use prior($I_k$) to conditional use probability prediction function 235.

In this embodiment, signaled factor prediction function 220 provides the predicted signaled factor probability prob($S_n$)$_t$ to conditional use probability prediction function 235.

In this embodiment, conditional use probability prediction function 235 calculates posterior probability as prob($I_k|S_n$) = [prob($S_n|I_k$)*prior($I_k$)]/prob($S_n$) at one or more points in time and provides the posterior probability prob($I_k|S_n$) to caching value estimation function 250.

As described herein, each possible combination of signaled factors $S_n$ represents a possible scenario. In order to determine the overall probability of use of content item $I_k$, the probability of using content item $I_k$ within every scenario $S_n$ is calculated. Thus, in the Bayesian embodiment, a measure indicative of the cumulative probability of use of content item $I_k$ at some time t across all signaled factor scenario combinations from 1 to m may be determined as follows:

$$\text{prob}(I_k)_t = \sum_{n=1}^{m} [\text{prob}(S_n | I_k) * \text{prior}(I_k)] / \text{prob}(S_n)$$

This Bayesian embodiment is illustrated at a high level in FIG. 2, and may be better understood with respect to the following calculation example.

In this example, assume that there are two factors in user signaled information $S_n$ (namely, "Time-Available", which has the value Show=1 hr or Movie=2 hrs; and "Genre", which can have values Action, or Romance). In order to simplify this example, further assume that "Time-Available" and "Genre" must have a value, and cannot have more than one value (e.g., a user may not signal "Action" and "Romance at the same time). In this example, further assume that probability of use will be calculated at two different points in the future (namely, Afternoon and Evening). Thus, there are four different combinations of factors making up user signaled information $S_n$, which, for purposes of this example, will be given the following probabilities (as listed in Table 2A):

TABLE 2A

|  | Afternoon | Evening |
|---|---|---|
| prob(Movie, Action) = | 0.25 | 0.3 |
| prob(Movie, Romance) = | 0.15 | 0.4 |
| prob(Show, Action) = | 0.4 | 0.1 |
| prob(Show, Romance) = | 0.2 | 0.2 |

In continuation of this example, assume that there are two content items $I_k$ under consideration for caching, namely, "Sleepless in Seattle" and "Raiders of the Lost Ark", and that prior probability of usage prob($I_k$) in the absence of signaled information for these content items is: Prior(Sleepless)=0.13 and Prior(Raiders)=0.12. For the different content items $I_k$ under consideration, assume that the following associated joint signaled factor probabilities prob($S_n|I_k$) have been observed from other users (as listed in table 2B):

TABLE 2B

| Signaled information was: | When user watched: | This proportion of time: |
|---|---|---|
| Movie, Action | Sleepless | 0.1 |
| Movie, Romance | Sleepless | 0.5 |
| Show, Action | Sleepless | 0.1 |
| Show, Romance | Sleepless | 0.2 |
| Movie, Action | Raiders | 0.55 |
| Movie, Romance | Raiders | 0.15 |
| Show, Action | Raiders | 0.25 |
| Show, Romance | Raiders | 0.05 |

As described herein, the cumulative posterior probability may be calculated as follows:

$$\text{prob}(I_k) = \sum_{n=1}^{m} [\text{prob}(S_n | I_k) * \text{prior}(I_k)] / \text{prob}(S_n)$$

In this example, in order to calculate the probability that Sleepless will be used in the Evening (i.e., t=Evening), the following values will be calculated and summed (rounded to two significant digits):

prob(Sleepless|Movie, Action)=[prob(Movie, Action|Sleepless)*prior(Sleepless)]/prob(Movie, Action)=[0.1*0.13]/0.3=0.04 prob(Sleepless|Movie, Romance)=[prob(Movie, Romance|Sleepless)*prior(Sleepless)]/prob(Movie, Romance)=[0.5*0.13]/0.4=0.16 prob(Sleepless|Show, Action)=[prob(Show, Action Sleepless)*prior(Sleepless)]/prob(Show, Action)=[0.1*0.13]/0.1=0.13 prob(Sleepless|Show, Romance)=[prob(Show, Romance|Sleepless)*prior(Sleepless)]/prob(Show, Romance)=[0.2*0.13]/0.2=0.13

Thus, the cumulative probability across all scenarios for 'Sleepless' in the 'Evening' is computed as: 0.043+0.1625+0.13+0.13=0.47

Similarly, the cumulative probability across all scenarios for 'Sleepless' in the 'Afternoon' is 0.65 the cumulative probability across all scenarios for 'Raiders' in the 'Evening' is 0.60, and the cumulative probability across all scenarios for 'Raiders' in the 'Afternoon' is 0.49 (detailed calculations are shown below in Table 2C).

In continuation of this example, assume use of a weighting factor that indicates that caching of a movie in the evening is worth 4 and caching of a movie in the afternoon is worth 8. Using these weighting factors, the value of caching Sleepless is calculated to be (0.65*8+0.47*4)=7.0 and the value of caching Raiders is calculated to be (0.471*8+0.595*4)=6.1. Therefore, since the value of caching Sleepless is greater than the value of caching Raiders, Sleepless will be cached in preference to Raiders.

The values from this example are summarized as follows (in Table 2C):

TABLE 2C

|  | prob($S_n|I_k$) | prior($I_k$) | prob($S_n$) | prob($I_k|S_n$) |
|---|---|---|---|---|
| Probability of using 'Sleepless' in the Evening | | | | |
| Sleepless, Evening | | | | |
| Movie, Action | 0.1 | 0.13 | 0.3 | 0.043 |
| Movie, Romance | 0.5 | 0.13 | 0.4 | 0.1625 |
| Show, Action | 0.1 | 0.13 | 0.1 | 0.13 |
| Show, Romance | 0.2 | 0.13 | 0.2 | 0.13 |
|  |  |  |  | 0.4655 |
| Probability of using 'Sleepless' in the Afternoon | | | | |
| Sleepless, Afternoon | | | | |
| Movie, Action | 0.1 | 0.13 | 0.25 | 0.052 |
| Movie, Romance | 0.5 | 0.13 | 0.15 | 0.433 |
| Show, Action | 0.1 | 0.13 | 0.4 | 0.0325 |
| Show, Romance | 0.2 | 0.13 | 0.2 | 0.13 |
|  |  |  |  | 0.6475 |
| Probability of using 'Raiders' in the Evening | | | | |
| Raiders, Evening | | | | |
| Movie, Action | 0.55 | 0.12 | 0.3 | 0.22 |
| Movie, Romance | 0.15 | 0.12 | 0.4 | 0.045 |
| Show, Action | 0.25 | 0.12 | 0.1 | 0.3 |
| Show, Romance | 0.05 | 0.12 | 0.2 | 0.03 |
|  |  |  |  | 0.595 |
| Probability of using 'Raiders' in the Afternoon | | | | |
| Raiders, Afternoon | | | | |
| Movie, Action | 0.55 | 0.12 | 0.25 | 0.246 |
| Movie, Romance | 0.15 | 0.12 | 0.15 | 0.12 |
| Show, Action | 0.25 | 0.12 | 0.4 | 0.075 |
| Show, Romance | 0.05 | 0.12 | 0.2 | 0.03 |
|  |  |  |  | 0.471 |

| Probability of Use | Afternoon | Evening |  |  |
|---|---|---|---|---|
| Sleepless | 0.6478 | 0.4658 | | |
| Raiders | 0.4890 | 0.5950 | | |
| Weight | 8 | 4 | | |
| Sleepless Weighted Value | 5.180 | 1.862 | 7.046 | Thus, value of caching Sleepless is higher. |
| Raiders Weighted Value | 3.912 | 2.380 | 6.292 | |

In another embodiment, conditional prediction of probability of use prob($I_k|S_n$) is assumed to be provided directly by joint signaled factor and item use probability estimation function 230, instead of through a Bayesian approach. This is denoted herein as the "directly-observable" approach. In this embodiment, the form of the conditional prediction of probability of use (prob($I_k$ & $S_n$)) will be in the form prob($I_k|S_n$) and, thus, the conditional use probability prediction function 235 will calculate the cumulative posterior probability as follows:

$$prob(I_k) = \sum_{n=1}^{m} [prob(I_k | S_n) * prob(S_n)]$$

This directly-observable embodiment is illustrated at a high level in FIG. 2, and may be better understood with respect to the following calculation example.

In this example, let I, II, and III denote three different scenarios for user signaled information, e.g., to signal different mode, audience, available time, preferred genre, or other user factors. It may be noted that this example is highly simplified, as even the limited example described hereinabove with respect to Table 1 had 256 possible scenarios.

In this example, let A, B, C, D, E, F, and G be seven different possible content items, where each content item has a probability of use, and the probability of use may be different depending on what the user is signaling at that point in time. Note that one scenario of user signaled information may be "no signaled information".

In this example, the goal is to determine the cumulative probability of use for a content item, given that it is not known exactly which user signaled information scenario will be present. In this example, the cumulative probability of use for a content item is the sum, across all user signaled information scenarios, of the likelihood of use within that user signaled information scenario multiplied by the probability that the user signaled information scenario will occur.

In order to determine the overall probability of use, the probability of using each content item within each user signaled information scenario $S_n$ must be calculated. That is, a measure indicative of the cumulative probability of use of the content item, at some time t, across all user signaled factor combinations from 1 to m, may be constructed as follows:

$$prob(I_k)_t = \sum_{n=1}^{m} [prob(I_k | S_n) * prob(S_n)]$$

In this example, there are three user signaled information scenarios (n=3) and seven content items (k=7). The cumulative probability of use for each of the content items is calculated as follows (in Table 3):

TABLE 3

|  | Scenario | | | |
|---|---|---|---|---|
|  | I | II | III | |
| Probability of Scenario | 0.5 | 0.3 | 0.2 | Cumulative |
| A | 0.09 | 0.06 |  | 0.063 |
| B | 0.08 |  |  | 0.04 |
| C | 0.07 | 0.05 |  | 0.05 |
| D |  | 0.04 |  | 0.012 |
| E |  |  | 0.03 | 0.006 |
| F |  |  | 0.02 | 0.004 |
| G |  |  | 0.01 | 0.002 |

In this example, the cumulative probability of use for content item 'A' is calculated as: (the probability of use in Scenario I multiplied by the probability of scenario I=0.09*0.5=0.045)+(the probability of use in Scenario II multiplied by the probability of scenario II=0.06*0.3=0.018)+(the probability of use in Scenario III multiplied by the probability of scenario III=0*0.5=0), resulting in a total cumulative probability for content item "A" of 0.063 (as shown in Table 3 above). The cumulative probability of each of the other content items may be calculated in a similar fashion. Thus, in this example, the ordering of content items by cumulative probability of use would be: A, C, B, D, E, F, and G.

It should be noted, however, that it is not always the case that a caching mechanism will necessarily cache content items in this order. In one embodiment, for example, it may be more effective to ensure that one or more of the top content items within each scenario is cached so that, no matter which user signaling information scenario eventually occurs, there is always at least some content available relevant to that scenario. In this example, this might, for example, lead to caching content items E and F before caching content item D so that at least some content relevant to scenario III is cached.

Although primarily depicted and described herein with respect to two methods of determining conditional prediction of probability of use prob($I_k|S_n$), namely, the Bayesian approach and the directly-observable approach, it will be appreciated that other methods of determining conditional prediction of probability of use prob($I_k|S_n$) may be employed. In such other embodiments, less or more information may be used and, similarly, fewer or more functions may be used (or the functions described herein may be utilized in a different manner).

Thus, conditional use probability prediction function 235 determines the measure indicative of the cumulative probability of use of content item $I_k$ at some time t across all signaled factor scenario combinations from 1 to m, and provides this measure to caching value estimation function 250 for use in computing a caching value estimate (value$_k$) of content item $I_k$.

The item caching value weighting function 240 provides one or more weighting factors for use by caching value estimation function 250. The function of the weighting factor is to translate the probability that a content item will be used into the value of caching that content item, by incorporating time, item specific, and other information. In one embodiment, item caching value weighting function 240 may maintain a weighting factor (denoted as $W_{k,t}$) for each content item $I_k$. The weighting factor $W_{k,t}$ associated with content item $I_k$ is the weight associated with content item $I_k$ at a future point in time t. The weighting factor $W_{k,t}$ may be better understood with respect to FIG. 3.

Figure 3:
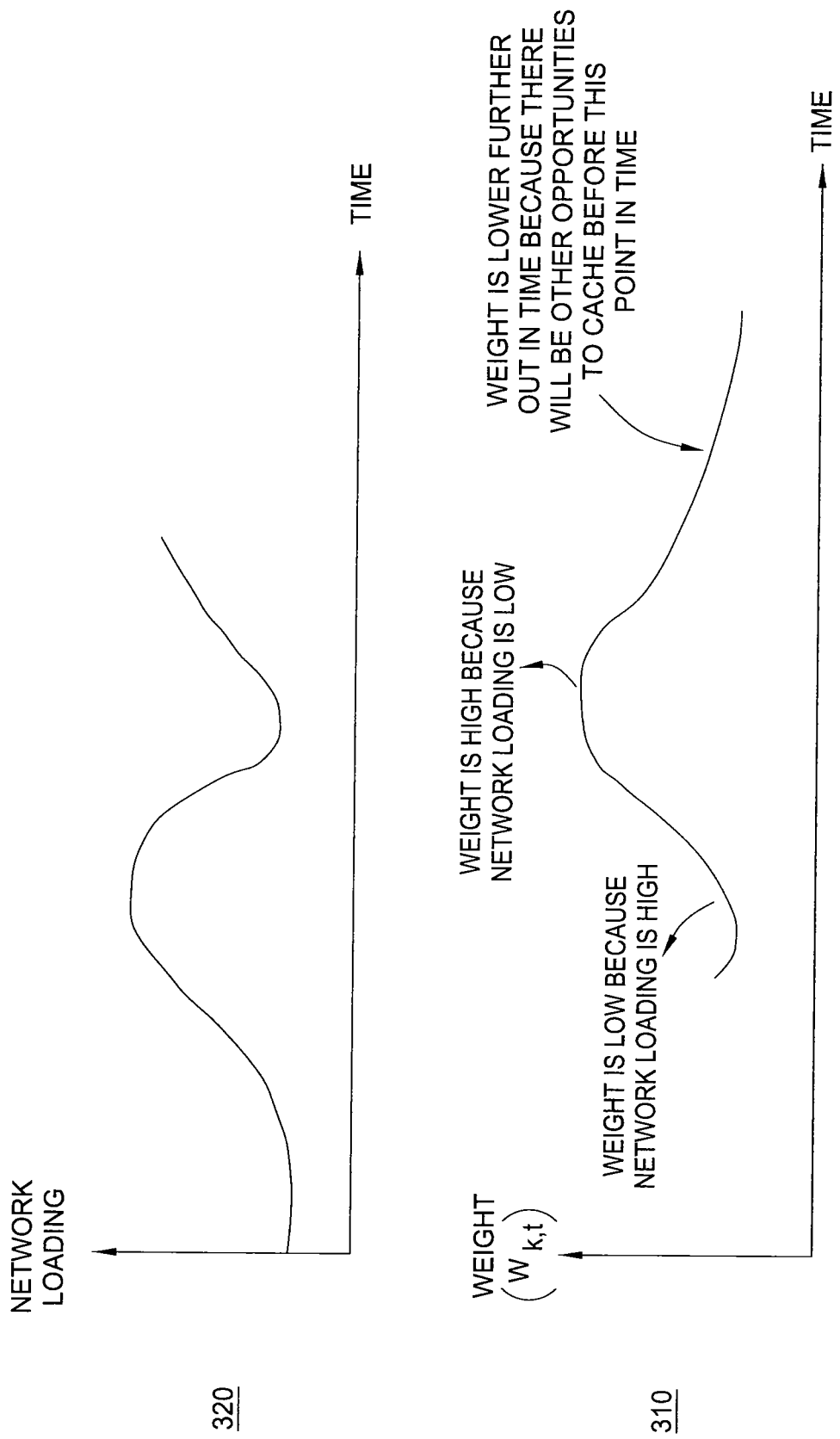
FIG. 3 depicts an exemplary weighting factor associated with a content item.

FIG. 3 depicts an exemplary weighting factor $W_{k,t}$ associated with a content item $I_k$.

In one embodiment, weighting factor $W_{k,t}$ is a function of network conditions (e.g., peak network times versus off-peak network times).

In one embodiment, weighting factor $W_{k,t}$ is a function of the size of the content item $I_k$.

In one embodiment, weighting factor $W_{k,t}$ is a function of whether the content item is currently stored in the content cache 105 for the user.

In one embodiment, in which the calculation of caching value is performed for a network caching node to which multiple users are attached, the weighting factor $W_{k,t}$ may account for the pre-existence of that content item $I_k$ within the user based caches of all of the users subtended from the network caching node. In general, there will be no value to caching at a more aggregate point in the network if that content item is already cached closer to the user, however, there may be exceptions to this general case. For example, if the user-based cache has a very high turnover of cached content items, then a content item which is cached now may have been dropped from the cache before the user uses it, in which case having a copy of the content item at the more aggregating caching point will have value.

The weighting factor $W_{k,t}$ may be a function of one or more other factors.

FIG. 3 depicts an exemplary embodiment in which weighting factor $W_{k,t}$ associated with content item $I_k$ is a function of network conditions (e.g., peak network times versus off-peak network times) and the size of the content item $I_k$. FIG. 3 depicts a graph 310 of weighting factor $W_{k,t}$ versus time and depicts a graph 320 of network loading versus time, where weighting factor graph 310 and network loading graph 320 are aligned in a manner depicting dependencies between weighting factor $W_{k,t}$ and network loading (and, thus, content item size).

As depicted in FIG. 3, in this embodiment, the weighting factor $W_{k,t}$ for a content item $I_k$ is high if the time period in question is close to the current time but separated by a sufficient length of off-peak network time that there is sufficient time for the content item $I_k$ to be selected, retrieved, propagated, and cached. The weighting factor $W_{k,t}$ for a content item $I_k$ may be high under other conditions.

As depicted in FIG. 3, in this embodiment, the weighting factor $W_{k,t}$ for a content item $I_k$ is low: (1) if the time period being considered is too close to the current time (i.e., there is insufficient time for the content item $I_k$ to be selected, retrieved, and cached); (2) if the time period being considered is a peak network time; and (3) if the time period being considered is in the distant future (e.g., because there will be other opportunities to cache the content item $I_k$ before that distant time). In addition, there is reduced value in caching items which are expected to be useful only further out in time, because during the intervening period the expectation of utility may decrease. The weighting factor $W_{k,t}$ for a content item $I_k$ may be low under other conditions.

The caching value estimation function 250 computes a smoothed, time-weighted caching value estimate value for content item $I_k$ (denoted as caching value estimate value, value$_k$). The caching value estimate (value$_k$) of a content item $I_k$ is computed using the conditional prediction of probability of use prob($I_k|S_n$). The caching value estimate (value$_k$) of a content item $I_k$ is smoothed and time-weighted using the weighting factor $W_{k,t}$ associated with content item $I_k$. In one embodiment, the caching value estimate (value$_k$) is computed for content item $I_k$ as follows:

$$value_k = \int_{t=now}^{\infty} prob(I_k)_t W_{k,t} \, dt$$

The caching value estimator 110 may compute the caching value estimate for content item $I_k$ periodically (e.g., once each hour, once each day, and the like) and/or a periodically (e.g., in response to one or more trigger conditions, such as receiving user signaled factors which may be used to recomputed predicted signaled factor information, in response to changes in one or more eternal factors that causes a change to predicted signaled factor information, in response to detecting a change in one or more characteristics of the content item, and the like, as well as various combinations thereof).

The caching value estimator 110 computes a caching value estimate for each content item $I_k$ in the set of content items.

The caching value estimator 110 provides the caching value estimate for content item $I_k$ to a content caching controller adapted for using the caching value estimate for content item $I_k$ to selected ones of the content items to be cached on a user device.

The caching value estimator 110 may provide caching value estimate for content items to a content caching controller in any manner (e.g., according to any schedule, using any communications capabilities, and the like).

The caching value estimator 110 may provide the caching value estimates for content items to a content caching controller a periodically (e.g., providing the values as they are computed) and/or periodically (e.g., providing all values computed since the last time values were provided).

Although primarily depicted and described herein with respect to one embodiment of caching value estimator 110 that utilizes specific functions to compute caching value estimates for content items, caching value estimator 110 may be implemented in any manner adapted for computing caching value estimates for content items. The information used to compute caching value estimates may be managed in any manner. The caching value estimates may be computed using any combinations of functions, elements, modules, and the like.

Although primarily depicted and described herein with respect to embodiments in which the value of caching a content item $I_k$ is determined as a weighting factor $W_{k,t}$ for content item $I_k$, in other embodiments the value of caching a content item $I_k$ may be constant for some or all of the content items (e.g., setting $W_{k,t}$ equal to a constant (e.g., 1, 2, or any other appropriate value) for some or all of the content items under consideration for caching). In such embodiments, the caching value estimate value$_k$ associated with the content item is essentially based on the probability of use of that content item.

Figure 4:
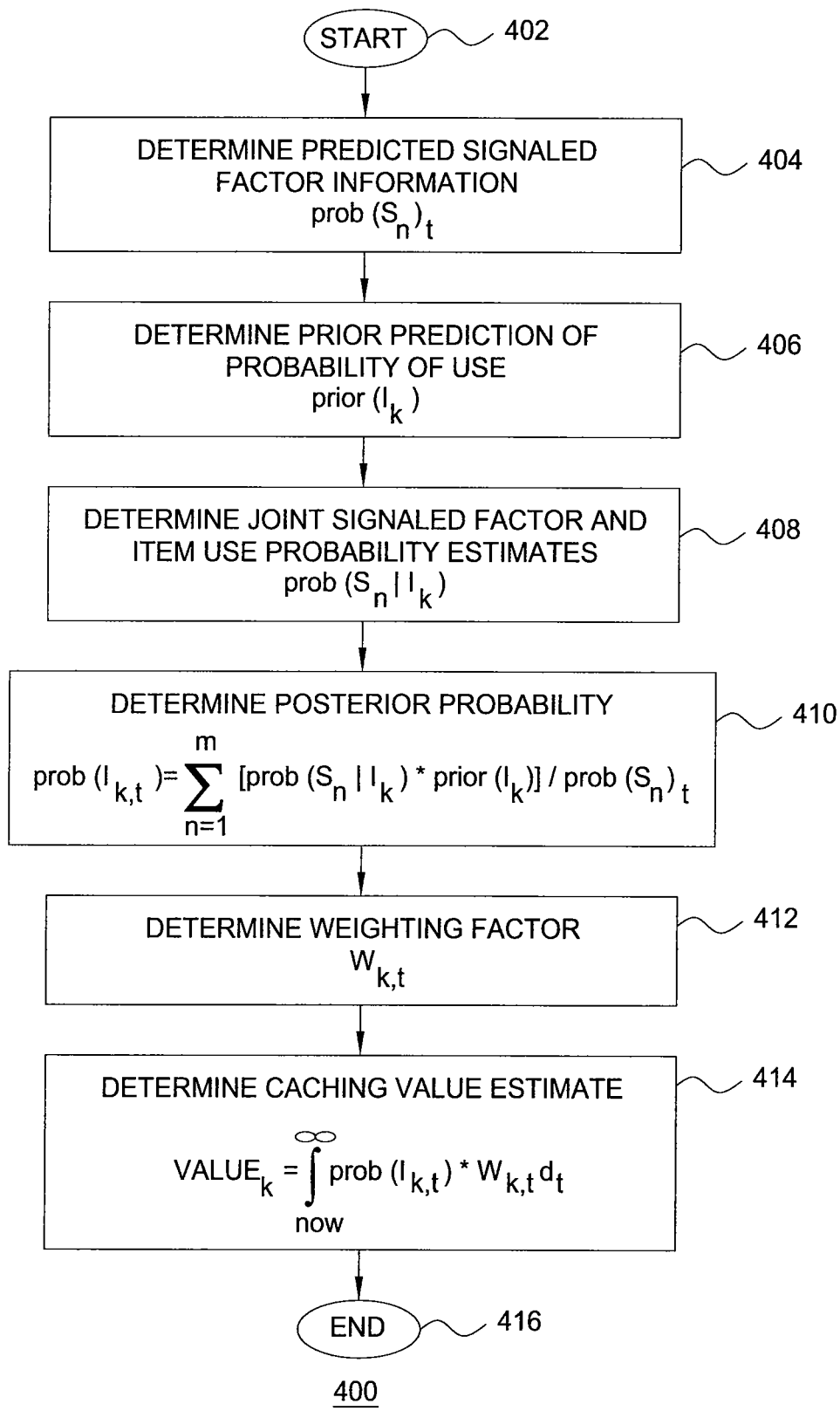
FIG. 4 depicts an embodiment of a method for determining information adapted for use in selecting content items to be cached for a user device.

FIG. 4 depicts a method according to one embodiment of the present invention. Specifically, method 400 of FIG. 4 includes a method for computing a caching value estimate for a content item using a Bayesian updating approach.

Although depicted and described with respect to determining one caching value estimate for one content item, method 400 is performed for each content item for use in selecting ones of the content items to be cached for a user. In one embodiment, the caching value estimate is based on a probability that a content item will be used at future points in time based on a Bayesian updating of an initial estimate of probability that the item will be used.

Although depicted and described as being performed serially, at least a portion of the steps of method 400 may be performed contemporaneously, or in a different order than depicted and described with respect to FIG. 4. The method 400 begins at step 402 and proceeds to step 404.

At step 404, predicted signaled factor information (prob $(S_n)_t$) is determined for one or more points in time t in the future. At step 406, a prior prediction of probability of use (prior($I_k$)) is determined. At step 408, joint signaled factor and item use probability estimates (prob ($S_n$ & $I_k$)) are determined in the form prob($S_n|I_k$). This set of information may be determined in any manner (as depicted and described with respect to FIG. 2).

At step 410, a posterior probability prob($I_k$)$_t$ is determined using the predicted signaled factor information (prob($S_n$)$_t$), the prior prediction of probability of use (prior($I_k$)), and the joint signaled factor and item use probability estimates (prob ($S_n|I_k$)). At step 412, a weighting factor ($W_{k,t}$) is determined.

At step 414, a caching value estimate (value$_k$) is determined using the posterior probability and the weighting factor. The caching value estimate is adapted for use in determining whether or not to select the content item as one of the content items to be cached at the user device.

At step 416, method 400 ends. Although depicted and described as ending (for purposes of clarity), method 400 may be repeated for each content item, and may be repeated for each content item as desired and/or needed (e.g., periodically and/or a periodically based on a change of one of the inputs).

Figure 5:
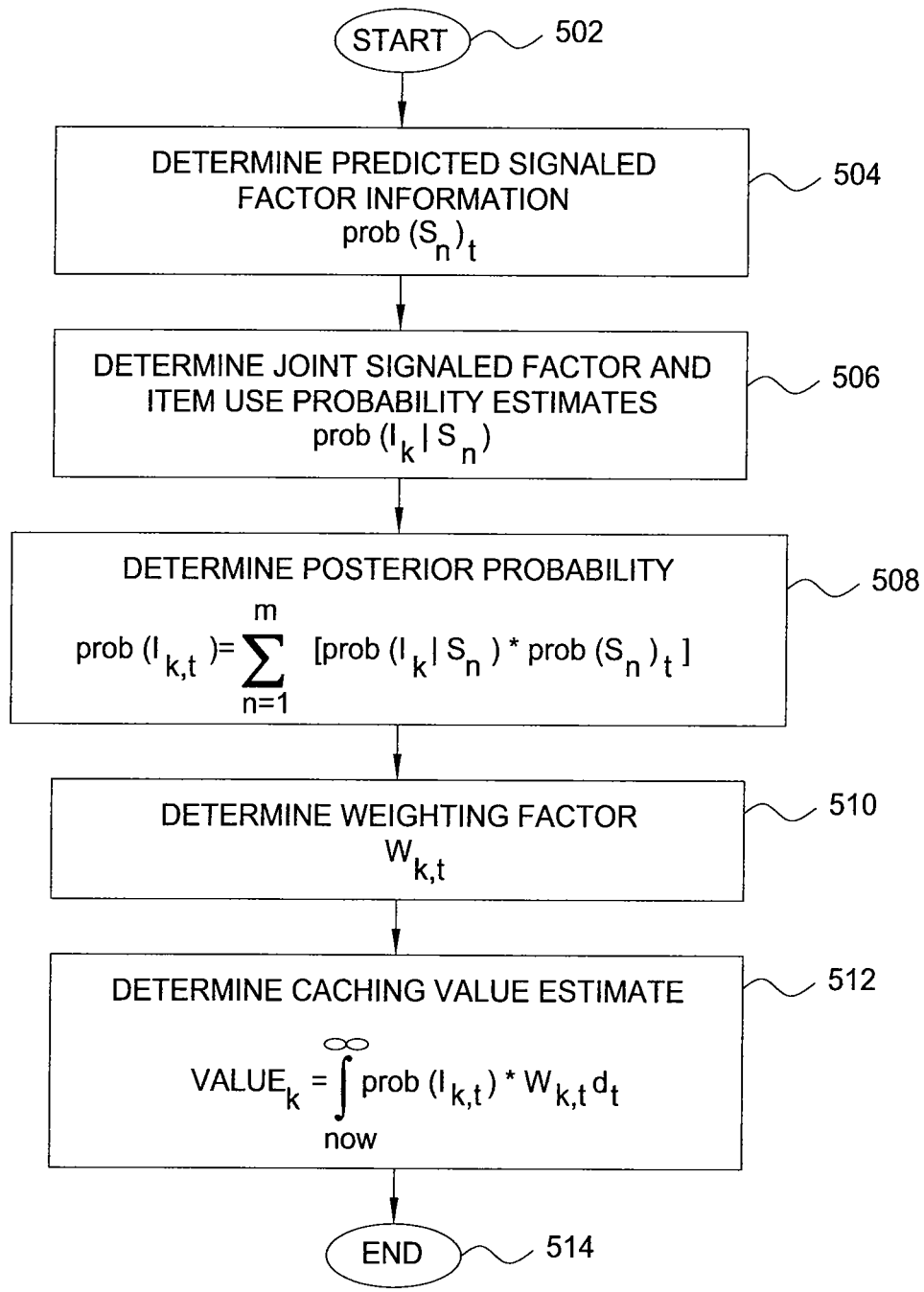
FIG. 5 depicts an embodiment of a method for determining information adapted for use in selecting content items to be cached for a user device.

FIG. 5 depicts a method according to one embodiment of the present invention. Specifically, method 500 of FIG. 5 includes a method for computing a caching value estimate for a content item using a non-Bayesian approach.

Although depicted and described with respect to determining one caching value estimate for one content item, method 500 is performed for each content item for use in selecting ones of the content items to be cached for a user. In one embodiment, the caching value estimate is based on a probability that a content item will be used at future points in time based on a non-Bayesian estimate of probability that the item will be used.

Although depicted and described as being performed serially, at least a portion of the steps of method 500 may be performed contemporaneously, or in a different order than depicted and described with respect to FIG. 5. The method 500 begins at step 502 and proceeds to step 504.

At step 504, predicted signaled factor information (prob $(S_n)_t$) is determined for one or more points in time t in the future. At step 506, joint signaled factor & item use probability estimates (prob($S_n$ & $I_k$)) are determined in the form (prob $(I_k|S_n)$. This set of information may be determined in any manner (as depicted and described with respect to FIG. 2).

At step 508, a posterior probability prob($I_k$)$_t$ is determined using the predicted signaled factor information (prob($S_n$)$_t$) and the joint signaled factor and item use probability estimates prob ($I_k|S_n$). At step 510, a weighting factor ($W_{k,t}$) is determined.

At step 512, a caching value estimate (value$_k$) for this point in time is determined using the posterior probability and the weighting factor. The caching value estimate is adapted for use in determining whether or not to select the content item as one of the content items to be cached at the user device.

At step 514, method 500 ends. Although depicted and described as ending (for purposes of clarity), method 500 may be repeated for each content item k, and may be repeated for each content item as desired and/or needed (e.g., periodically and/or a periodically based on a change of one of the inputs).

Although primarily depicted and described herein with respect to embodiments in which content items are cached at the user device (as opposed to being cached further back in the network), in embodiments in which content is not cached at the user device but, rather, is cached further back in the network at a network node serving multiple subtending users, the present invention may be applied as depicted and described herein for all subtending users as a group such that the value of caching each content item is aggregated across all subtending users as a group in order to determine which content items should be cached at the network node serving those subtending customers.

Figure 6:
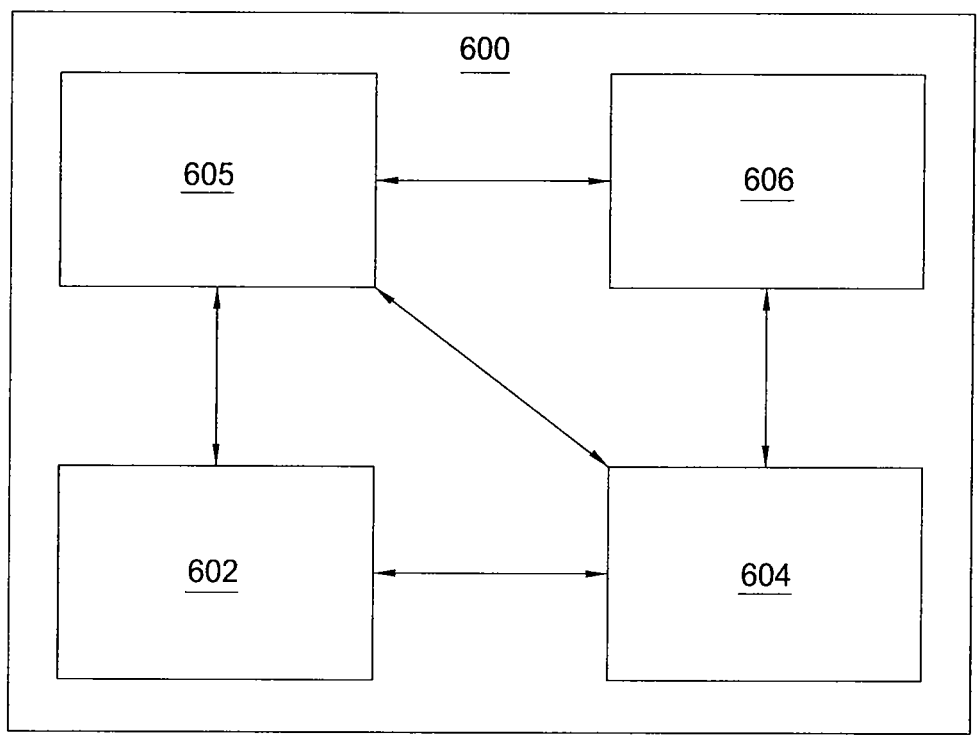
FIG. 6 depicts a high-level block diagram of a general-purpose computer suitable for use in performing the functions described herein.

FIG. 6 depicts a high-level block diagram of a general-purpose computer suitable for use in performing the functions described herein. As depicted in FIG. 6, system 600 comprises a processor element 602 (e.g., a CPU), a memory 604, e.g., random access memory (RAM) and/or read only memory (ROM), a caching value estimation module 605, and various input/output devices 606 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the caching value estimator process 605 can be loaded into memory 604 and executed by processor 602 to implement the functions as discussed above. As such, caching value estimator process 605 (including associated data structures) of the present invention can be stored on a computer readable medium or carrier, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast or other signal bearing medium, and/or stored within a working memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for selecting, from a set of content items, one or more content items to be cached, the method comprising:
   determining, for each content item in the set of content items, a respective probability of use value for the content item that is indicative of a probability that the content item will be used if the content item is cached, wherein, for at least one of the content items in the set of content items, determining the probability of use value for the content item comprises:
      determining predicted signaled factor information comprising information indicative of a probability that a set of signaled factors will be received;
      determining joint probability information comprising a joint probability of a combination of receiving the set of signaled factors and the content item being used by a user; and
      determining the probability of use value for the content item based on the predicted signaled factor information and the joint probability information;
   determining, for each content item in the set of content items, a respective value of caching the content item;
   computing, for each content item in the set of content items, a respective caching value estimate associated with the content item wherein the caching value estimate associated with the content item is computed based on the respective probability of use value for the content item and the respective value of caching the content item; and
   selecting, from the set of content items based on the respective caching value estimates of the content items, one or more content items to be cached.

2. The method of claim 1, wherein the respective probability of use value for the content item comprises a posterior probability of use estimate that is determined using a Bayesian updating process or a directly observable probability of use estimate that is determined given a set of user signaled information.

3. The method of claim 1, wherein the respective probability of use value for the content item comprises a posterior probability of use estimate for the content item that is determined using a Bayesian updating process, wherein the posterior probability of use estimate for the content item is determined based on prior probability of use information comprising a prior probability of the content item being used in the absence of user signaled information, wherein the joint probability of the combination of receiving the set of signaled factors and the content item being used by the user comprises a joint probability of the set of signaled factors being received when the content item is being used by the user.

4. The method of claim 3, wherein the prior probability of the content item being used in the absence of user signaled information is determined based on at least one of a past content viewing history of the user, content preference information associated with the user, or information indicative of popularity of the content item with at least one other user.

5. The method of claim 1, wherein the respective probability of use value for the content item is a directly observable probability of use estimate for the content item that is determined given a set of user signaled information, wherein the joint probability of the combination of receiving the set of signaled factors and the content item being used by the user comprises a joint probability of the content item being used by the user when the set of signaled factors is received.

6. The method of claim 1, wherein the predicted signaled factor information comprises a predicted signaled factor probability for a predicted signaled factor, wherein the predicted signaled factor probability for the predicted signaled factor is determined by:
   receiving previous signaled factors associated with the user, wherein the previous signaled factors comprise at least one user signaled factor entered by the user via at least one user device in the past; and
   determining the predicted signaled factor probability for the predicted signaled factor based on the at least one user signaled factor.

7. The method of claim 6, wherein the predicted signaled factor comprises at least one of an audience factor indicative of one or more individuals expected to consume the content item, a genre factor, an available-time factor indicative of an available time to consume the content item, a factor indicative of a preferred content item length, a preferred content item mood factor, a popularity factor, a critical rating factor, a factor indicative of audience age, a factor for signaling potentially offensive content, or a factor indicative of a preferred tempo of the content item.

8. The method of claim 6, wherein the predicted signaled factor probability for the predicted signaled factor is determined as a function of at least one external factor.

9. The method of claim 8, wherein the at least one external factor comprises at least one of a time of day, a day of week, a day of year, or a specified holiday.

10. The method of claim 1, wherein the respective probability of use value for the content item is determined as a sum, over a plurality of combinations of values of signaled factors in the set of signaled factors, of a probability of use of the content item within that combination of values of signaled factors in the set of signaled factors multiplied by a probability of occurrence of that combination of values of signaled factors in the set of signaled factors.

11. The method of claim 1, wherein, for at least one content item in the set of content items, the respective caching value estimate associated with the content item is calculated as a time-weighted sum at multiple points in the future.

12. The method of claim 1, wherein, for at least one content item in the set of content items, determining the respective value of caching the content item comprises:
   determining a benefit of caching the content item;
   determining a cost of caching the content item; and
   determining the respective value of caching the content item based on the benefit of caching the content item and the cost of caching the content item.

13. The method of claim 12, wherein the benefit of caching the content item is:
lowered based on a determination that the content item is already cached;
or
increased based on a determination that caching of the content item is likely to reduce network load during a peak usage period.

14. The method of claim 12, wherein the cost of caching the content item is dependent on at least one of a size of the content item, available space in a cache, or network resources that are consumed to retrieve the content item.

15. The method of claim 1, wherein, for at least one content item in the set of content items, the respective caching value estimate associated with the content item is computed based on a weighting factor.

16. The method of claim 15, wherein the weighting factor is dependent on at least one of a network loading factor, a network overloading cost factor, or a size of the content item.

17. The method of claim 1, wherein, for the at least one of the content items in the set of content items, the respective caching value estimate associated with the content item is computed as:

$$value_k = \int_{now}^{\infty} prob(I_{k,t}) W_{t,k} \, dt,$$

wherein k denotes the respective content item, $prob(I_{k,t})$ comprises the respective probability of use value for the content item k at a time t, wherein and $W_{t,k}$ comprises the respective value of caching the content item k at the time t.

18. The method of claim 17, wherein $prob(I_{k,t})$ comprises a cumulative posterior probability determined using a Bayesian updating approach or a cumulative probability determined using a directly-observable approach;
wherein, when the $prob(I_{k,t})$ comprises the cumulative posterior probability determined using a Bayesian updating approach, the probability of use value $prob(I_{k,t})$ is computed as:

$$prob(I_{k,t}) = \sum_{n=1}^{m} [prob(S_n \mid I_k) * \text{prior}(I_k)] / prob(S_n),$$

wherein $S_n$ comprises the set of signaled factors, m comprises a number of signaled factor scenario combinations, $prob(S_n \mid I_k)$ comprises a joint probability of the set of signaled factors $S_n$ being received when the content item is being used by the user, $\text{prior}(I_k)$ comprises a prior probability of the content item being used in the absence of user signaled information, and $prob(S_n)$ comprises the probability that the set of signaled factors $S_n$ will be received;
wherein, when the $prob(I_{k,t})$ comprises the cumulative probability determined using a directly-observable approach, the probability of use value $prob(I_{k,t})$ is computed as:

$$prob(I_{k,t}) = \sum_{n=1}^{m} [prob(I_k \mid S_n) * prob(S_n)],$$

wherein $S_n$ comprises the set of signaled factors, m comprises a number of signaled factor scenario combinations, $prob(I_k \mid S_n)$ comprises a joint probability of the content item being used by the user when the set of signaled factors $S_n$ is received, and $prob(S_n)$ comprises the probability that the set of signaled factors $S_n$ will be received.

19. The method of claim 1, further comprising:
propagating the selected one or more content items toward a content cache adapted to cache the selected one or more content items.

20. The method of claim 19, wherein the cache is located at least one of:
on a user device of a user; or
on a network device configured to serve the user and at least one additional user.

21. The method of claim 1, further comprising:
propagating the respective caching value estimates associated with the content items in the set of content items toward an element configured to select the one or more content items to be cached based on the respective caching value estimates associated with the content items in the set of content items.

22. An apparatus for selecting, from a set of content items, one or more content items to be cached, the apparatus comprising:
a processor and a memory communicatively connected to the processor, the processor configured to:
determine, for each content item in the set of content items, a respective probability of use value for the content item that is indicative of a probability that the content item will be used if the content item is cached, wherein, for at least one of the content items in the set of content items, to determine the probability of use value for the content item, the processor is configured to:
determine predicted signaled factor information comprising information indicative of a probability that a set of signaled factors will be received;
determine joint probability information comprising a joint probability of a combination of receiving the set of signaled factors and the content item being used by a user; and
determine the probability of use value for the content item based on the predicted signaled factor information and the joint probability information;
determine, for each content item in the set of content items, a respective value of caching the content item;
compute, for each content item in the set of content items, a respective caching value estimate associated with the content item wherein the caching value estimate associated with the content item is computed based on the respective probability of use value for the content item and the respective value of caching the content item; and
select, from the set of content items based on the respective caching value estimates of the content items, one or more content items to be cached.

23. A non-transitory computer-readable storage medium storing a software program which, when executed by a computer, causes the computer to perform a method for selecting, from a set of content items, one or more content items to be cached, the method comprising:
determining, for each content item in the set of content items, a respective probability of use value for the content item that is indicative of a probability that the content item will be used if the content item is cached, wherein, for at least one of the content items in the set of content items, determining the probability of use value for the content item comprises:

determining predicted signaled factor information comprising information indicative of a probability that a set of signaled factors will be received;

determining joint probability information comprising a joint probability of a combination of receiving the set of signaled factors and the content item being used by a user; and determining the probability of use value for the content item based on the predicted signaled factor information and the joint probability information;

determining, for each content item in the set of content items, a respective value of caching the content item;

computing, for each content item in the set of content items, a respective caching value estimate associated with the content item wherein the caching value estimate associated with the content item is computed based on the respective probability of use value for the content item and the respective value of caching the content item; and selecting, from the set of content items based on the respective caching value estimates of the content items, one or more content items to be cached.

\* \* \* \* \*